United States Patent [19]

Reilly

[11] 4,060,164
[45] Nov. 29, 1977

[54] METHOD AND APPARATUS FOR LOADING BLOW MOLDING MACHINES

[75] Inventor: Joseph R. Reilly, Naugatuck, Conn.

[73] Assignee: Monsanto Company, St. Louis, Mo.

[21] Appl. No.: 645,052

[22] Filed: Dec. 29, 1975

[51] Int. Cl.² .............................................. B65G 37/00
[52] U.S. Cl. ..................................... 198/424; 198/491;
 198/524; 198/532; 198/560; 214/1 B; 214/152
[58] Field of Search .......................... 214/1 R, 1 B, 152;
 198/22 B, 26, 20 R, 424, 491, 492, 524,
 530–532, 539, 560

[56] References Cited

U.S. PATENT DOCUMENTS

| 1,191,407 | 7/1916 | Dawson | 198/103 X |
| 1,718,607 | 6/1929 | Soubier | 198/22 B |
| 3,056,604 | 10/1962 | Deford | 198/424 X |
| 3,583,544 | 6/1971 | Prodzenski | 198/22 B |
| 3,698,536 | 10/1972 | Pray et al. | 198/26 |
| 3,877,563 | 4/1975 | Hayashi | 198/424 X |
| 3,908,812 | 9/1975 | Graff | 198/22 B |

FOREIGN PATENT DOCUMENTS

| 1,923,491 | 3/1971 | Germany | 425/387 |
| 1,532,932 | 7/1971 | Germany | 198/524 |

Primary Examiner—Frank E. Werner
Attorney, Agent, or Firm—Michael J. Murphy

[57] ABSTRACT

Apparatus for charging heated preforms to moving loading hoppers of a blow molding machine comprises support assemblies for the preforms, a series of laterally adjacent slide assemblies at the outlet of a temperature-conditioning chamber and above the plane of movement of moving loading hoppers of a blow molding machine, conveying means for linearly transporting the support assemblies through the chamber and above the slide assemblies and means for sequentially actuating the slide assemblies according to a predetermined sequence. The method comprises linearly continuously advancing such preforms supported in side-by-side relationship above circularly moving loading hoppers of a blow molding machine and removing supports from beneath the side-by-side positioned preforms according to a predetermined sequence to permit each preform to drop by gravity into a particular one of such hoppers then passing beneath it.

4 Claims, 4 Drawing Figures

1

METHOD AND APPARATUS FOR LOADING BLOW MOLDING MACHINES

BACKGROUND OF THE INVENTION

This invention is directed toward method and apparatus for loading blow molding machines with temperature-conditioned workpieces such as elongated thermoplastic parts which are to be subsequently further shaped into molecularly oriented hollow articles such as containers.

In U.S. Pat. No. 3,754,851, a system is disclosed for blowing articles from molded preforms which are brought to orientation temperature in an intermediate conditioning step. In this approach heat is removed from the preform during conditioning and such has become known in the art as a "cool-down" process. It is likewise known to add heat to preforms to bring them up to orientation temperature prior to finish forming as is typically disclosed in U.S. Pat. No. 3,715,109 and other related prior art, and such has become known in the art as a "reheat" process. In high speed, high capacity forming lines utilizing either of these approaches, it is clearly desirable to optimize the temperature-conditioning part of such techniques in order to keep fabricating costs related to this step at an absolute minimum. Thus, it is desirable to process a large number of parts at the same time, to minimize handling and reorienting movement of the distortable parts during conditioning, and during transfer to the blowing equipment and to expose each part as uniformly and completely as possible to the heat sink to minimize exposure time and complexity of apparatus.

Though the above-mentioned prior art has generally been successful in implementing cool-down and reheat processing, it is deficient in one or more aspects of the temperature-conditioning and blow molding equipment loading phases, especially when considered in the environment of a high speed, continuous, large capacity forming line.

SUMMARY OF THE INVENTION

Now there has been developed improvements at the interface between the temperature-conditioning and molding equipment adapted for use with parts intended to be subsequently blown into molecularly oriented articles, which avoid the aforementioned prior art shortcomings.

Accordingly, it is a basic object of this invention to provide improvements to facilitate efficient handling of a large number of elongated molded parts during loading of a blow molding machine from a temperature conditioning system.

Another object of this invention is to provide means for carrying out the prior object.

Other objects of this invention will in part be obvious and will in part appear hereinafter.

These and other objects are accomplished in a method of charging heated preforms to circularly moving hoppers of a blow molding machine which comprises linearly continuously advancing such preforms supported in side-by-side relationship above such hoppers, and removing supports from beneath the side-by-side positioned preforms according to a predetermined sequence to permit each preform to drop by gravity into a particular one of such hoppers then passing beneath it.

Apparatus is provided for charging hot preforms to moving loading hoppers of a blow molding machine comprising support assemblies for the preforms, a series of laterally adjacent slide assemblies at the outlet of a temperature-conditioning chamber and above the plane of movement of moving loading hoppers of a blow molding machine, conveying means for linearly transporting the support assemblies through the chamber and above the slide assemblies and means for sequentially actuating the slide assemblies according to a predetermined sequence.

BRIEF DESCRIPTION OF THE DRAWINGS

In describing the overall invention, reference will be made to the accompanying drawings wherein.

DETAILED DESCRIPTION OF PREFERRED EMBODIMENTS

Figure 1:
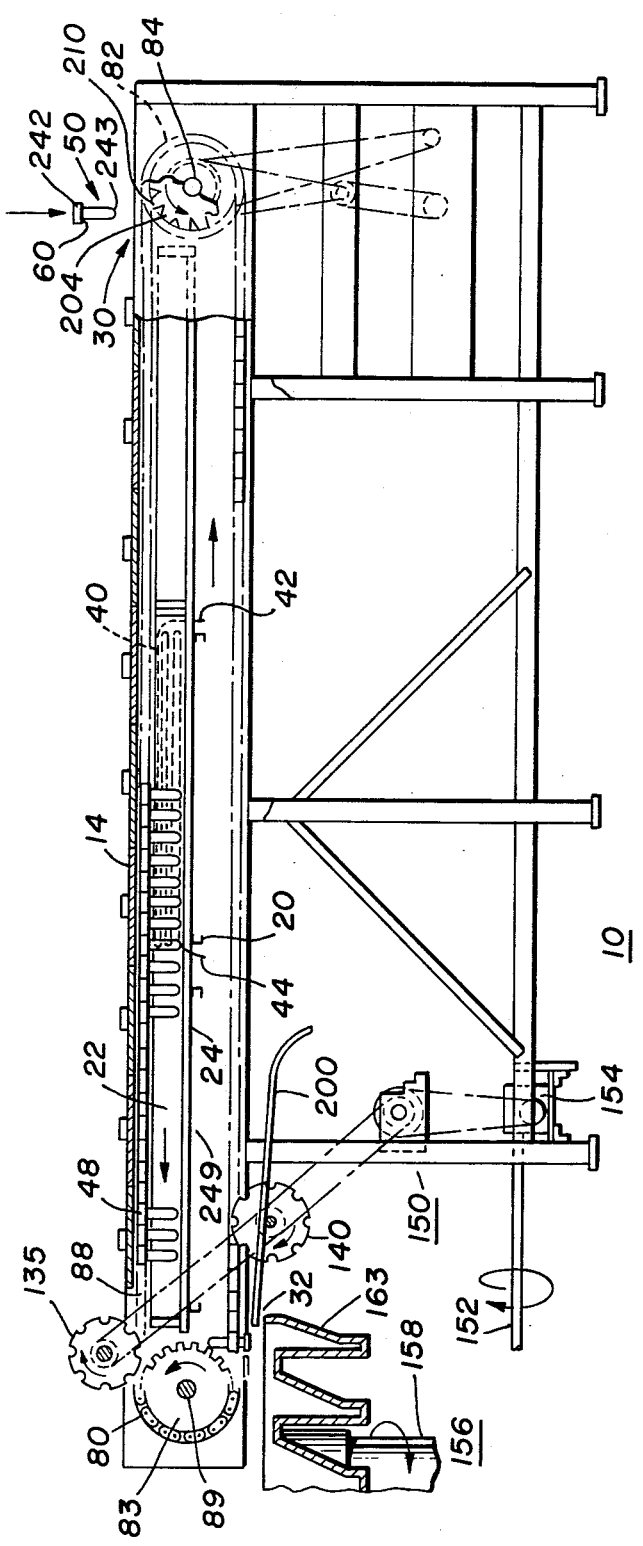
FIG. 1 is a vertical, partially schematic, sectional view of apparatus embodying the invention.

Referring now to the drawings, there is illustrated in FIG. 1, apparatus 10 for temperature-conditioning elongated molded parts. Apparatus 10 comprises opposing vertical side panels 12 (FIG. 2) and sectioned top panel 14 (FIG. 1). Horizontal support members 20 span the space between side panels 12 and support heat transfer units, such as 21 (FIG. 2), secured thereto and positioned in end to end relationship so as to form a horizontally extending heat transfer zone or chamber generally indicated as 22. Three such units are typically illustrated in FIG. 1. Each unit 21 has a floor member 24 dividing chamber 22 into an upper course and a lower course, the latter being downwardly open to the surroundings along its length.

Chamber 22 has a feed end generally indicated at 30 in FIG. 1 at which is located a charging or loading station, and an opposite discharge end similarly indicated at 32.

Each heat transfer unit 21 comprises a heat transfer assembly which includes upright panels 38 spaced from each other in the horizontal direction and extending along the length of chamber 22. Each panel 38 is secured to a floor member 24 and contains flow channels generally indicated as 40 in FIG. 1 in serpentine form having means including tube portions 42 and 44 connected via suitable conventional valving into a reservoir for circulating a heat transfer medium under pressure through channels 40, for the purpose of controlling the air temperature between adjacent panels. A narrow, generally parallel path is therefore formed between each pair of adjacent panels 38 for the parts being temperature conditioned. In the illustrated embodiment, ten such paths exist.

A plurality of bar assemblies 48 support workpieces such as elongated molded parts 50 (FIG. 1) in suspended vertical position between adjacent panels 38. Each bar assembly 48 when in a parts-conditioning position within chamber 22 is situated immediately above panels 38 (FIG. 1) and arranged for movement from feed end 30 to discharge end 32 and back again in an endless path in a manner to be described. Bar assembly 48 includes annular, part-supporting and rotating mechanisms, not shown, situated in a series of horizontally spaced openings formed in a vertically thin, horizontally long, rectangular housing, each opening being vertically aligned above a path when in part-supporting position in apparatus 10. Though assemblies 48 in the illustrated embodiments are above panels 38 when in the heat transfer zone of the apparatus because of the particular configuration of parts 50 being treated, it is possible to position them beneath heating units with parts being treated seated therein in an upright position.

Means for advancing each bar assembly 48 through chamber 22 comprises an endless chain 80 (FIG. 1) on each side of chamber 22 extending lengthwise thereof and a pair of sprockets 82 and 83 for each such chain at the feed end 30 and discharge end 32 of chamber 22. Each pair of sprockets 82, 83 are conventionally keyed to chain drive shafts 84 and 89 suitably journaled for rotative movement in bearings mounted in blocks in side panels 12. Also, conventional means such as a variable speed motor, not shown, operatively connected to shaft 84 are provided to rotate the latter. Optionally includable (FIG. 2) at the discharge end of the upper course are friction wheels 96 secured to each sprocket 83 and having resilient discs 100 for contacting the underside of a bar assembly 48 at each end as it moves downwardly from the upper course toward the lower course of chamber 22.

Means 86 (FIG. 2) secured to side panels 12 form opposing endless guideways 88 with such side panels on either side of chamber 22. Each housing 48 is provided at opposite ends with outwardly projecting stub shafts having rotary followers 94 (FIG. 2) thereon for continuous, bar assembly-supportive movement in guideways 88 during travel of a bar assembly 48 along the upper and lower courses of chamber 22.

Figure 2:
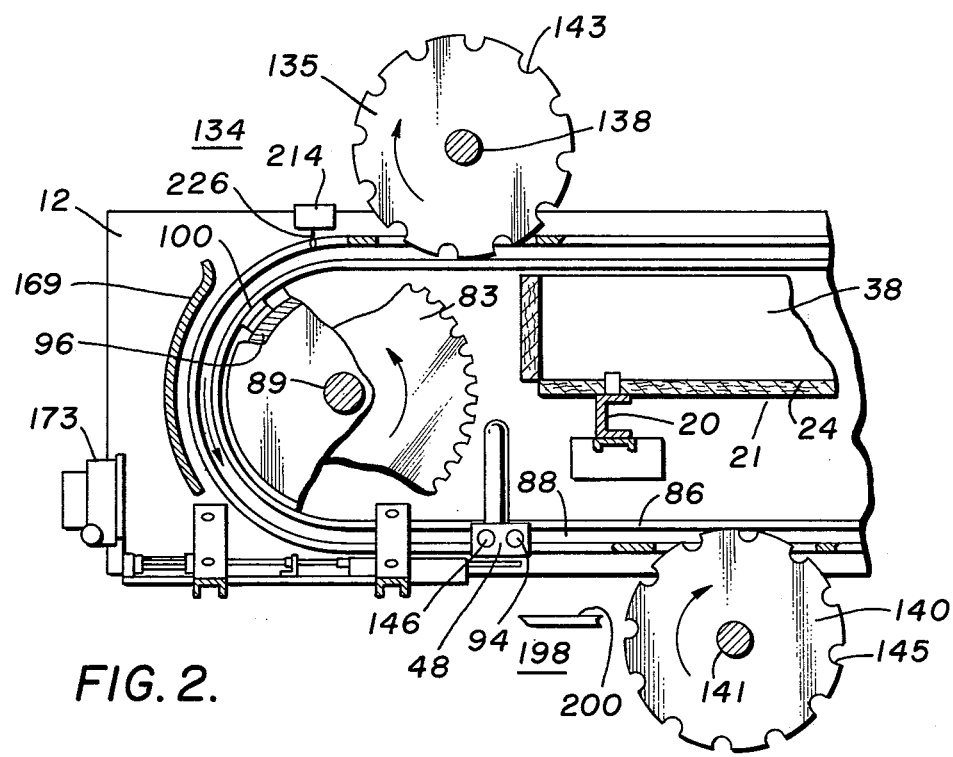
FIG. 2 is an enlarged, partially sectioned, side elevational, schematic view of components at the discharge end of the apparatus of FIG. 1.

Metering means generally indicated at 134 in FIG. 2 at discharge end 32 control the inventory of assemblies 48 in the upper course and sequentially release bar assemblies to the lower course. Such metering means includes a pair of laterally opposed upper metering wheels 135 mounted on opposite ends of shaft 138 journaled for rotary movement, and a pair of lower metering wheels 140 on shaft 141 similarly journaled for rotary movement. Each pair of such metering wheels have circumferentially spaced radially extending slots 143 and 145 for cooperating with a boss 146 on the end of a stub shaft protruding from either end of bar assembly 48. Each pair of bosses first releasably engages a pair of slots 143 in upper metering wheels 135 and subsequently in slots 145 in lower metering wheels 140. Drive means for such wheels is generally indicated as 150 (FIG. 1). In the illustrated embodiment, the prime mover for such drive means 150 preferably is part of the drive train for the molding equipment downstream of apparatus 10, which for example, is connected directly to shaft 152 in FIG. 1. Means 150 in the illustrated embodiment includes a gear box 154 and associated conventional intermediate sprockets and shafts, not here further described, for rotating both wheel sets 135 and 140 at the same speed. Metering means 134 further includes curved, parts-guide member 169 (FIG. 2) between the upper and lower metering wheels situated outwardly of chain drive sprockets 83 and extending across the width of chamber 22 for supporting parts 50 as they move between the upper and lower courses of the chamber.

Figure 3:
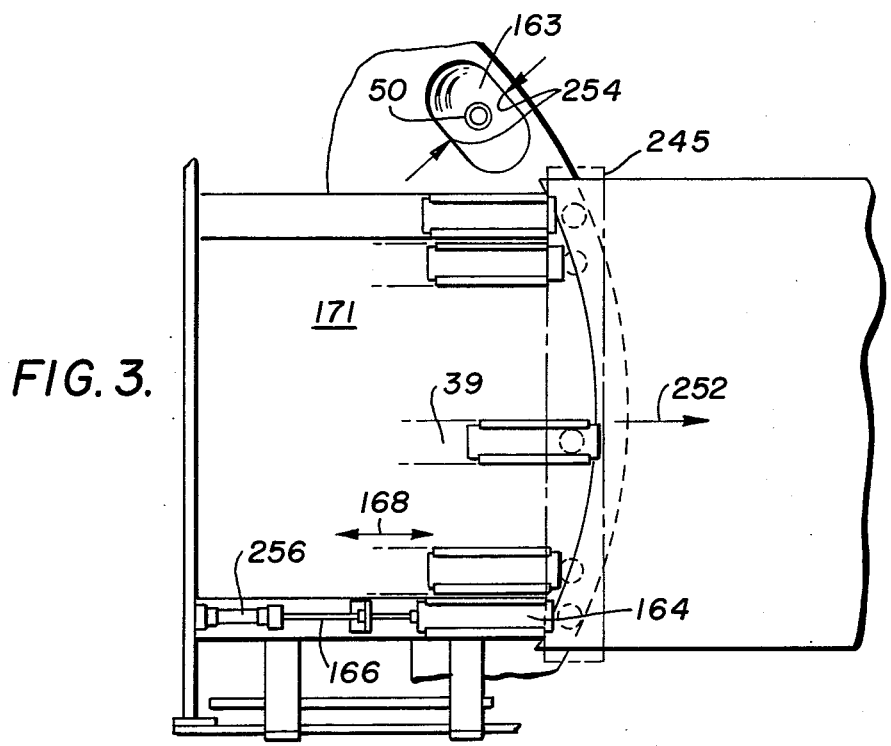
FIG. 3 is a plan view of components shown in FIG. 2.

Gate means (FIGS. 2 and 3) generally indicated as 171 at discharge end 32 on the lower course of chamber 22 release parts 50 from each bar assembly in a controlled manner as the latter moves along guideway 88 between the upper and lower metering wheels. Movable hopper means 156 (FIG. 1) beneath gate means 171 (FIG. 3) receive parts 50 in hoppers 163 on being released. Hoppers 163 mounted for rotary movement about a central main shaft 158 which is driven from downstream molding equipment, not shown.

Gate means 171 (FIG. 3) comprises a series of slide gates 164 arranged in an arc, one for each path 39, with each being attached to a rod 166 reciprocable as at 168 by means of pressurized air selectively admitted to cylinders 256 housing a conventional piston on the end of each rod 166. By reciprocating gate member 164 rearwardly to the left, a part 50 drops by gravity into a hopper 163 passing beneath it. Gate members 164 must be reciprocated according to a predetermined pattern to order that the linearly arranged forwardly moving preforms in each bar assembly drop into the circularly moving hoppers 163 at the proper time. Such predetermined sequence may be controlled by suitable conventional electric switches and multi-port solenoid valves in the air supply line feeding each cylinder 256 of the gate means 171. Box 173 (FIG. 2) houses such switches.

Auxiliary drive means, not shown, may be provided for rotating the upper and lower metering wheel pairs and which is automatically electrically actuated when the main drive from the downstream molding equipment is deenergized, for example, due to a process malfunction. When such auxiliary drive means functions, each gate member 164 via suitable electric interlocks remains shut and consequently each part 50 in a bar assembly 48 as it moves downwardly after being released by the upper to the lower metering wheel is dragged across the closed gate members (FIG. 1) and then drops by gravity into a suitable parts collection means 198 (FIG. 2) beneath discharge end 32 of chamber 22 and adjacent movable hopper means 156. Such parts collection means 198 may include a contoured chute 200 to direct the falling parts toward a central scrap recovery and reprocessing area, not shown.

At the feed end 30 of chamber 22 infeed means admit each bar assembly 48 at regular intervals to the parts charging station and then to upper course of chamber 22 in a manner to be described. Such infeed means comprises a pair of laterally spaced escapement wheels such as 204 journal mounted to main chain drive shaft 84. Each such escapement wheel has forwardly directed, spaced radially extending slots 210 (FIG. 1) formed in its periphery similar to those in the metering wheels at the other end of the apparatus. The same previously described boss 146 at each end of a bar assembly 48 seats in slots 210 in each of such escapement wheels 204 when the bar assembly is being held at the feed end 30 during loading. Power means, not shown, are provided for cyclically rotating such wheels 204 and includes limit switch 214 (FIG. 2) conventionally electrically interlocked with such power means. Limit switch 214 by contact of its arm 226 (FIG. 2) with each bar assembly passing between the upper 135 and lower 140 metering wheels electrically activates the motor portion of the power means to rotate an output shaft a preset amount sufficient to lift an empty, dwelling bar assembly from the right hand end of the lower course upwardly via engagement of bosses 146 in slots 210 in the escapement wheels into the loading station at feed end 30.

Figure 4:
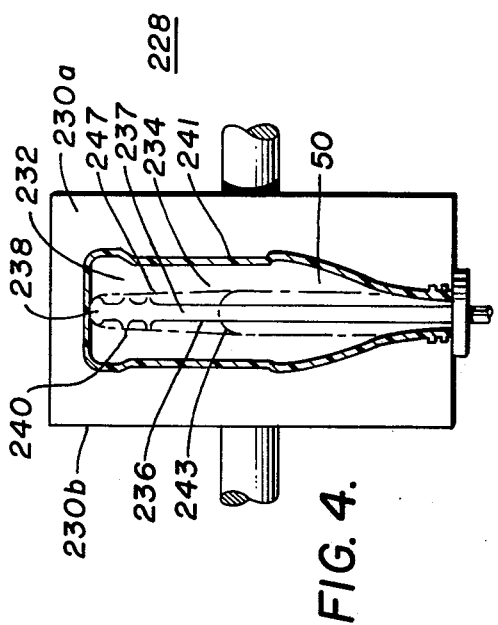
FIG. 4 is a vertical, schematic view of a molding station downstream of the apparatus of FIG. 1.

In FIG. 4, a molding station generally indicated as 228 includes opposing mold sections 230a and 230b closable on each other in conventional manner to form cavity 232 having a periphery conforming to that of a hollow article, such as bottle 241. Cavity 232 though illustrated in an upside-down position may be positioned right-side up. Stretch and blow assembly 234 cooperates with sections 230 and includes an extendable stretch rod member 236 having a shoe portion 238 on its forward end and is reciprocably mounted by suitable means in an opening at one end of cavity 232. Rod member 236 has an interior passage 237 opening into air outlet ports 240 for admitting air under pressure to the interior of a molded part 50 either during or subsequent to stretching the closed end of such part 50 against the base of cavity 232.

In operation, previously molded, preforms 50 preferably having a closed end 243, a finish portion 242 and a step 60 immediately below such finish, are provided to apparatus 10. Preforms 50 may be at room temperature or alternatively and preferably will have been discharged from an injection or blow molding station a few moments before and consequently will be at a somewhat elevated temperature. In any event, it is desired to bring the thermoplastic material preferably constituting the body portion below step 60 in FIG. 1 of each preform 50 to within a molecular orientation temperature range, i.e. the range at which substantial molecular orientation can be developed on stretching.

Preforms 50 are loaded at feed end 30, into the sockets formed in a bar assembly 48, while each such assembly temporarily dwells, usually for a matter of a few seconds, in the loading station, i.e. at substantially a 12:00 o'clock position with respect to escapement wheel 204, FIG. 1. Each loaded preform is supported in suspended relationship with the preforms in a particular bar assembly forming a linearly oriented collection extending perpendicular to the centerline of chamber 22. Though preforms 50 might be positioned in the system with closed ends 243 uppermost, the reverse is preferred both to minimize handling in subsequent operations, and to avoid sagging of the weight of the body portion back on the finish portion 242 when the preforms are at elevated temperature.

After each bar assembly 48 has been loaded, it being understood that each position therein need not be filled, it is released from the loading position by rotation of escapement wheels 204, such that bosses 146 which had been seated in engagement with the walls of slots 210 are free to move out of such slots under the influence of continuously advancing chains 80.

When the most recently released bar assembly reaches the last prior one in chamber 22 under the conveying influence of chains 80, it gently strikes the rear surface thereof which serves as an abutment against further advancement at chain speed, and via structure, not shown, each preform then rotates with respect to its bar assembly 48 as the latter continues to be conveyed forwardly toward the discharge end of the apparatus.

As each assembly 48 moves forwardly, the rotating body portion of each of the plurality of preforms 50 moving in parallel passes between a pair of adjacent heat transfer panels 38. During movement of the parts through the apparatus, finish portion 242 of each preform which does not require any further reshaping, is situated above the top of panels 38 and consequently is shielded from exposure to the panels.

When a bar assembly reaches the end of the single pass heat transfer zone, i.e. at the left end of panels 38 in FIG. 2, the continuously turning upper metering wheel pair 135 rotates downwardly to bring slots 143 into momentary engagement with followers 146 on either side of the heat transfer zone. As a particular pair of slots containing bosses 146 turns through a portion of the lower arc in FIG. 2 of wheels 135, the engaged bar assembly is metered forward and freed by the continued upward movement of the slot pair. As the followers exit a slot pair 143, in order to prevent each bar assembly from free falling by gravity between the top and bottom courses of chamber 22 and thereby possibly distorting the soft parts 50 therein, discs 100 engage the underside of each assembly urging followers 94 outwardly against the surface of the outer guideway forming member, thereby carefully guiding the assembly between the courses at chain speed. As each assembly is thus turned downwardly, preforms 50 abut guide member 169 which prevents them from sliding out of the bar assemblies as a result of such upending turning movement.

As the bar assembly approaches the bottom course of chamber 22, each preform passes along guide member 169 and gradually assumes an inverted position while partially sliding out of its opening in the bar assembly until the surface defining the open end of the top of the finish comes into contact with the upper surface of a reciprocable slide gate 164. Accordingly, each preform is temporarily supported (FIG. 2) on end in an upended position while still in a bar assembly continuously moving without interruption except now in an opposite rearward direction.

When the hoppers for accepting the preforms are continuously moving in a circular path, and the linearly arranged preforms in a bar assembly are moving in a linear direction, the preforms should be released by gate members 164 according to a predetermined drop sequence, i.e. as close as possible to the precise moment the longitudinal axis of a preform 50 is coincident with that of a hopper 163. In other words, as bar assembly 48 moves forward in the direction of arrow 252 in FIG. 3 radially to the rotary path of hoppers 163, at a given time a particular hopper will be under a particular linearly arranged preform depending on the position of the particular bar assembly as illustrated in phantom at 245. The drop sequence can be readily specified for any particular combination when the speeds of the bar assemblies and hoppers are known, and it may turn out for certain combinations that two or more preforms should be dropped simultaneously. Accordlingly, when the hopper for a preform resting on a particular gate member 164 in the illustrated embodiment is beneath such gate member, the latter is automatically reciprocated rearwardly via the piston and cylinder 256 so as to allow the preforms to drop by gravity out of the bar assemblies into individual hoppers. Specification of optimum drop pattern is important for the linear-rotary movement of the illustrated components since the further away the axis of a preform is from that of its hopper 163 at the precise moment of drop, the greater the necessary width in the direction 254 (FIG. 3) of a hopper, and as hopper width is increased, so likewise is the tendency for the soft, dropped part to tip and hang up in the throat at the lower end of the funnel-shaped hopper 163.

The temperature-conditioned preforms are then transferred, either automatically or manually or by combination thereof, to molding station 228, FIG. 11. Sections 230 are closed around it, stretch-blow assembly 234 brought into position such that rod member 236 is inserted into the open end and then actuated by suitable means to increase the length of the body portion as at 247 via forced contact of foot 238 against the inner surface of the closed end to thereby stretch the plastic and develop longitudinal or axial orientation. In the preferred procedure of the illustrated embodiment, after contact (or just prior thereto) of the outer surface of the closed end of the preform with the opposing wall of the mold cavity 232, air under pressure is admitted through ports 240 to expand it outwardly in a radial direction against the cavity wall to form the article and develop radial orientation. Axial and radial stretching, however, may be carried out simultaneously under certain conditions, e.g. when pronounced axial orientation is felt unnecessary.

After the parts are released, the bar assemblies are recycled via chains 80 in the opposite direction to feed end 30 for the start of another cycle.

Various modifications and alterations of the invention will be readily suggested to persons skilled in the art. It is intended therefore, that the foregoing be considered as exemplary only and that the scope of the invention be ascertained from the following claims.

What is claimed is:

1. A method of charging hot preforms to loading hoppers circularly moving in a substantially horizontal plane at a blow molding machine which comprises:

Linearly continuously advancing such preforms supported in side-by-side relationship above such hoppers; and Selectively removing supports from beneath individual ones of the side-by-side positioned preforms according to a predetermined sequence to permit each preform to drop by gravity into a particular one of said hoppers then passing beneath it.

2. The method of claim 1 wherein said support-removing step is accomplished by sliding gate members out from under open ends of such preforms.

3. Apparatus for charging heated preforms to loading hoppers circularly moving in a substantially horizontal plane at a blow molding machine which comprises, in combination:

A. support assemblies for carrying said preforms in side-by-side relationship;

B. a series of laterally adjacent slide assemblies at the outlet of a temperature-conditioning chamber and above the plane of movement of the hoppers;

C. conveying means for linearly transporting said support assemblies through said chamber and above said slide assemblies; and D. means for sequentially selectively actuating individual ones of said slide assemblies according to a predetermined sequence.

4. The apparatus of claim 3 wherein the slide assemblies are arranged in an arc.

* * * * *